United States Patent [19]

Millsap et al.

[11] Patent Number: 4,577,182

[45] Date of Patent: Mar. 18, 1986

[54] ALARM SYSTEM

[75] Inventors: James W. Millsap, Hammond, Ind.; Peter Miller, 5659 N. Drake, Chicago, Ill. 60659

[73] Assignee: Peter Miller, Chicago, Ill.

[21] Appl. No.: 598,851

[22] Filed: Apr. 10, 1984

[51] Int. Cl.[4] ........................ G08B 1/08; H04M 11/04

[52] U.S. Cl. .................................... 340/539; 340/506; 340/531; 340/505; 179/5 R; 179/2 EB; 455/33; 455/54

[58] Field of Search ............... 340/539, 531, 506, 505; 179/5 R, 5 P, 5.5, 2 EB; 455/33, 53-56, 67

[56] References Cited

U.S. PATENT DOCUMENTS

| | | | |
|---|---|---|---|
| 2,719,188 | 9/1955 | Pierce . | |
| 3,634,627 | 1/1972 | Velentini . | |
| 3,647,973 | 3/1972 | James et al. . | |
| 3,694,579 | 9/1972 | McMurray . | |
| 3,986,119 | 10/1976 | Hemmer, Jr. et al. | 455/54 |
| 4,023,139 | 5/1977 | Samburg . | |
| 4,338,493 | 7/1982 | Stenhuis et al. . | |
| 4,347,501 | 8/1982 | Akerberg . | |
| 4,371,751 | 2/1983 | Hilligoss, Jr. et al. | 179/5 R |
| 4,415,770 | 11/1983 | Kai et al. | 179/2 EB |
| 4,417,100 | 11/1983 | Carlson et al. . | |
| 4,447,872 | 5/1984 | Nothaft | 179/5 R |
| 4,465,904 | 8/1984 | Gottsegen et al. | 179/5 R |
| 4,467,142 | 8/1984 | Rupp et al. | 179/5 R |

FOREIGN PATENT DOCUMENTS

| | | | |
|---|---|---|---|
| 2749707 | 5/1979 | Fed. Rep. of Germany | 340/539 |

OTHER PUBLICATIONS

ADEMCO 7610-7620 Long Range Radio Advertising Materials (1984).

*Primary Examiner*—Donnie L. Crosland
*Attorney, Agent, or Firm*—George H. Gerstman

[57] ABSTRACT

An alarm system is provided in which an alarm condition causes a cellular transceiver automatically to transmit a telephone call to an alarm monitoring station by over-the-air transmission of a signal to a cellular site. A computer at the cellular site will cause communication between the cellular transceiver and an alarm company monitoring station. The alarm system includes a digital communicator with an alarm signal line connected to the digital communicator. The digital communicator is coupled to a cellular transceiver having a programmed keyboard, an audio input and an audio output. The digital communicator has an audio output and an interrogation input. The digital communicator's audio output is coupled to the cellular transceiver's audio input. The cellular transceiver's audio output is coupled to the digital communicator's interrogation input. The digital communicator includes a transmit enable output and a receive enable output. The cellular transceiver includes a transmit enable data line and a receive enable data line. The transmit enable output is coupled to the transmit enable data line and the receive enable output is coupled to the receive enable data line. An alarm signal received by the digital communicator causes the transmit enable output to transmit a signal to the transmit enable data line thereby enabling the cellular transceiver to transmit the telephone call via over-the-air transmission to the cellular site from where it is relayed to the alarm monitoring station.

9 Claims, 3 Drawing Figures

ALARM SYSTEM

BACKGROUND OF THE INVENTION

The present invention concerns a novel alarm system and, more particularly, an alarm system which avoids the problems concomitant with alarm systems that are wired to an alarm monitoring station.

It is typical for alarm systems, such as burglar alarm systems, to be connected via telephone lines to an alarm monitoring station. For example, the premises typically have a protective circuit which may comprise a number of intrusion detectors, a voltage source, a sensing relay and wiring connecting these components in series. The alarm system generally includes an alarm control panel where the sensing relay may be located, a key operated switch, and a latching relay. When an alarm condition occurs, the latching relay is caused to activate an audible and/or visible warning device and/or a signal that is transmitted via telephone lines to a police station or central office. In some instances, a dedicated telephone line from the premises to the police station is used. In other instances, a shared telephone line is used and a particular signal is issued on the telephone line corresponding to the alarm condition that has occurred.

An essential link between the protected premises and the police station or central office is the telephone line. However, the telephone wire may be cut and the voltage may be simulated, which will prevent the police station or central office from receiving the alarm communication.

It is, therefore, an object of the present invention to provide an alarm system in which there are no telephone lines connecting the protected premises to a police station or central office.

Another object of the present invention is to provide an alarm system that enables a telephone call to be made to an alarm monitoring station when an alarm condition occurs, without the problems concomitant with a hard wired system.

A further object of the present invention is to provide an alarm system that is reliable in operation, and uses wireless, over-the-air transmission without the restricted number of radio channel frequencies available with conventional mobile telephone systems. One of the serious problems with conventional mobile telephone systems is the restricted number of radio channel frequencies that are available, which may result in a substantial time period before an open line is available. The restricted number of available radio channel frequencies that are available with conventional mobile telephone systems seriously hampers the use of such systems in connection with premises that are protected by an alarm system.

Other objects and advantages of the present invention will become apparent as the description proceeds.

BRIEF DESCRIPTION OF THE INVENTION

In accordance with the present invention, an alarm system is provided which utilizes cellular telephone communication. A cellular system includes a continuous pattern of hexagon-shaped coverage areas (i.e., cells). Within each cell is a centralized base station containing control equipment for the channels assigned to that cell. All of the cells within a system communicate with each other and with a central control site, i.e., the telephone company.

The cellular system offers a great amount of capacity by using relatively low power transmitters and by segmenting each geographic area into cells. When the cellular system approaches optimal loading, the cells effectively split, and each cell is divided into still smaller, lower power cells. This permits reuse of channels and extends the system's loading capacity.

In the illustrative embodiment, the alarm system includes a digital communicator and means for connecting an alarm signal line to the digital communicator. The cellular transceiver has a programmed keyboard, an audio input and an output. The digital communicator has an audio output and an interrogation input. The digital communicator audio output is coupled to the cellular transceiver audio input. The cellular transceiver audio output is coupled to the digital communicator interrogation input. An antenna is connected to the cellular transceiver. In this manner, the alarm signal received by the digital communicator will operate the cellular transceiver to transmit an over-the-air signal to a cellular site. From the cellular site a signal can be forwarded to an alarm monitoring station with the alarm monitoring station being placed in communication with the cellular transceiver via the cellular site.

In the illustrative embodiment, the digital communicator includes a plurality of alarm inputs. Each of the inputs represents a selected location or a different alarm condition.

In the illustrative embodiment, the digital communicator includes a transmit enable output and a receive enable output. The keyboard includes a transmit enable data line and a receive enable data line. The digital communicator receive enable output is connected to the keyboard receive enable data line, and the digital communicator transmit enable output is connected to the keyboard transmit enable data line.

In the illustrative embodiment, the digital communicator and cellular transceiver are operable in a manner whereby an alarm signal received by the digital communicator will cause the transmit enable output to transmit a signal to the transmit enable data line. This will enable the cellular transceiver to transmit a call from a programmed telephone number via over-the-air transmission to a cellular site. The cellular site can communicate with an alarm monitoring station which will cause the transmission of an over-the-air signal to the cellular transceiver audio output. This will cause a signal to be transmitted to the digital communicator interrogation input, with a code signal being transmitted from the digital communicator audio output to the cellular transceiver audio input and then be transmitted over the air to the cellular site.

A more detailed explanation of the invention is provided in the following description and claims, and is illustrated in the accompanying drawings.

DETAILED DESCRIPTION OF THE ILLUSTRATIVE EMBODIMENT

Figure 1:
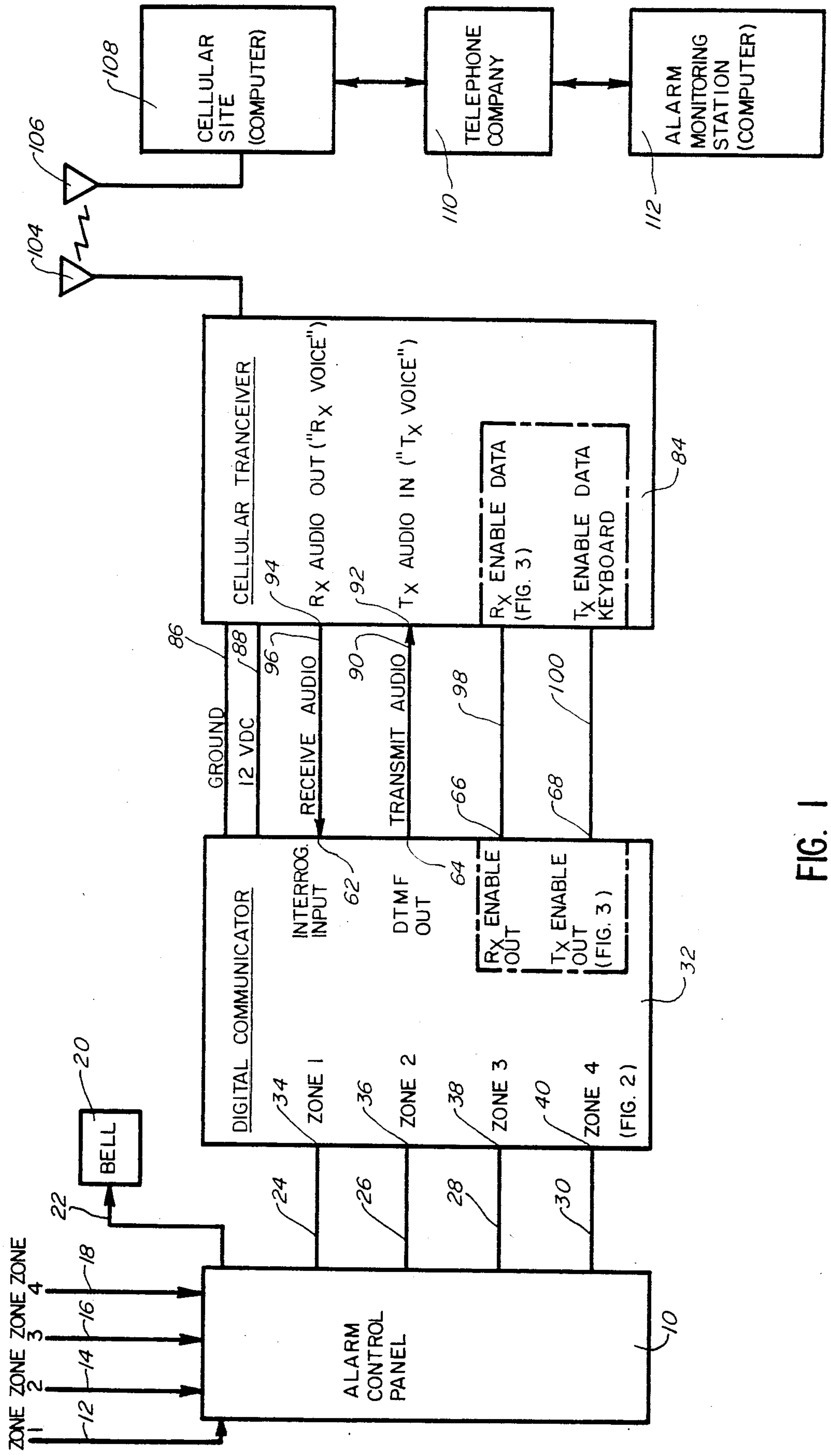
FIG. 1 is a block diagram of an alarm system constructed in accordance with the principles of the present invention.

Referring to FIG. 1, an alarm control panel 10 is shown therein. Alarm control panel 10 is of a conventional type, and has a plurality of input lines 12, 14, 16 and 18. Each of the input lines is connected to an intrusion detector as is well-known in the art. Alternatively, each of the input lines 12–18 may be connected to a different protected location, with the various locations utilizing the same alarm control panel 10. In the illustrative embodiment, input line 12 is connected to zone 1, input line 14 is connected to zone 2, input line 16 is connected to zone 3 and input line 18 is connected to zone 4.

An audible warning device 20, which in the illustrative embodiment is a bell, is connected to alarm control panel 10 via line 22.

The alarm control panel 10 has output alarm signal lines 24, 26, 28 and 30 which carry signals corresponding to the signals on lines 12, 14, 16 and 18, respectively. Alarm signal lines 24–30 are connected to a digital communicator 32 with line 24 being connected to zone 1 input 34, line 26 being connected to zone 2 input 36, line 28 being connected to zone 3 input 38 and line 30 being connected to zone 4 input 40.

Figure 2:
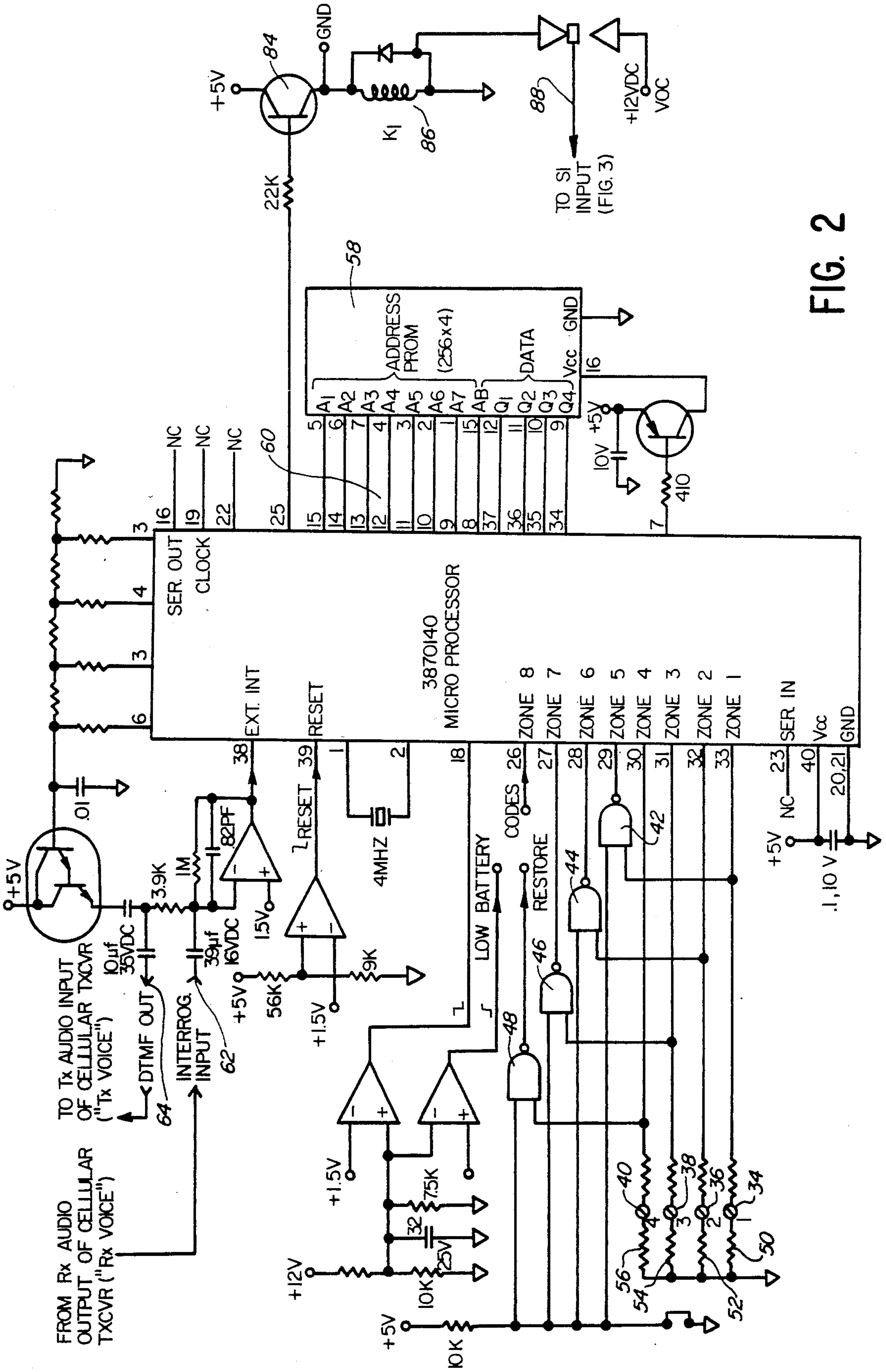
FIG. 2 is a schematic circuit diagram of a portion of the digital communicator of the alarm system of FIG. 1.
Figure 3:
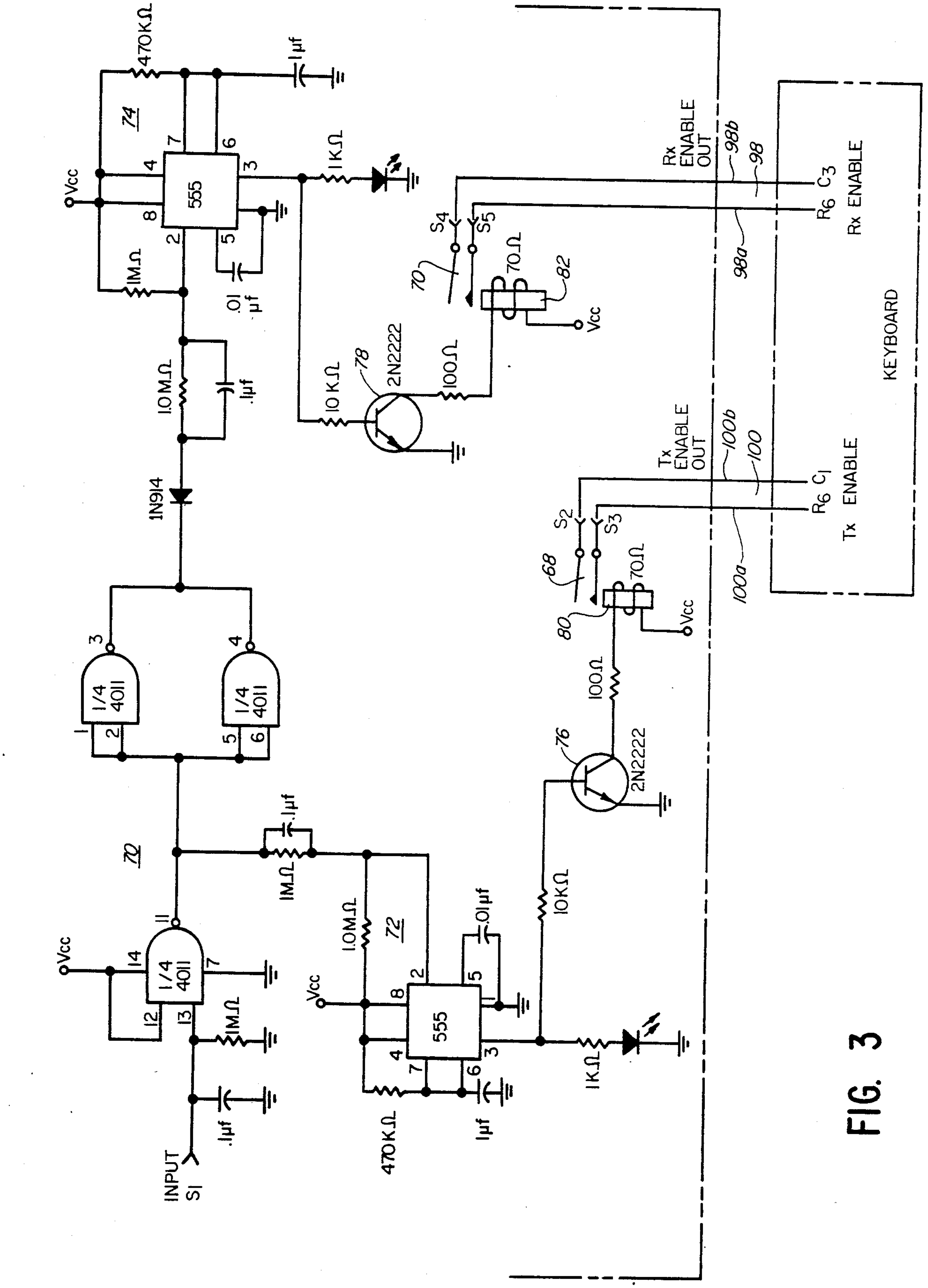
FIG. 3 is a schematic circuit diagram of another portion of the digital communicator of FIG. 1 and a portion of the keyboard of the cellular transceiver of FIG. 1.

Digital communicator 32 is shown in more detail in FIGS. 2 and 3. In the illustrative embodiment, the digital communicator is preferably an Acron DD3 digital communicator to which certain modifications have been made. The Acron digital communicator with modifications is illustrated in FIG. 2 and a digital interface which forms part of the digital communicator is illustrated in FIG. 3. The zone inputs 34, 36, 38 and 40 are illustrated in FIG. 2 and are coupled to inputs of NAND gates 42, 44, 46 and 48, respectively. These NAND gates act as buffers. Resistors 50, 52, 54 and 56 are pull-down resistors which require a logic level high to initialize the system. If the resistors were removed, a logic level low would initialize the system. The customer identification number and the status number are contained in an address PROM 58 which is connected to the microprocessor strobe lines 60.

Referring back to FIG. 1, digital communicator 32 includes an interrogation input 62, an audio output 64, a receive enable output 66, and a transmit enable output 68. Interrogation input 62 and audio output 64 are also illustrated in FIG. 2. In the illustrative embodiment, the audio output is a dual tone multiple frequency (DTMF) output.

The receive enable output 66 and the transmit enable output 68 form part of an interface circuit which is illustrated in FIG. 3. Referring to FIG. 3, the circuit includes one 4011 quad two-input NAND gate package 70, a first 555 timer 72, a second 555 timer 74, a first output control transistor 76, a second output control transistor 78, a first output control relay 80, and a second output control relay 82.

Referring to FIG. 2, when there is an alarm condition at zone inputs 34, 36, 38 or 40, transistor 84 is energized, activating relay 86 and causing arm 81 to transition from the logic level low to the logic level high (12 volts DC). Arm 88 is connected to input S1 of FIG. 3. When a low to high logic input signal is received at input S1, contacts S2, S3 of relay 80 will close momentarily to provide a short pulse. When a high to low logic input signal occurs at input S1, contacts S4, S5 of relay 82 will close momentarily to provide a short pulse. Contacts S2, S3 comprise the transmit enable output 68 of the digital communicator and contacts S4, S5 comprise the receive enable output 70 of the digital communicator.

Referring back to FIG. 1, it can be seen that digital communicator 32 is coupled to a cellular transceiver 84. A ground line 86 is provided and a 12 volt DC line 88 is also provided. Digital communicator audio output 64 is connected by a transmit audio line 90 to a transmit audio input 92 of the cellular transceiver. A receive audio output 94 of the cellular transceiver is coupled via receive audio line 96 to interrogation input 62.

The digital communicator 32 is also connected to a keyboard of the cellular transceiver. In the illustrative embodiment, the digital communicator receive enable output 66 is connected via line 98 to the receive enable data line of the keyboard. The digital communicator transmit enable output 68 is connected via line 100 to the transmit enable data line of the keyboard.

In the illustrative embodiment, cellular transceiver 84 is a Western Union cellular transceiver, Model 1154A103A. The control head logic portion of this Western Union cellular transceiver is illustrated in two circuit diagrams which are attached as an appendix to this specification, and may be referred to if necessary. As illustrated in FIGS. 2 and 3 of the drawings, and also in the circuit diagrams attached in the appendix, the keyboard is shown with receive enable output line 98*a* (FIG. 3) being connected to contact R6 and with receive enable output line 98*b* being connected to contact C3. Transmit enable output line 100*a* is connected to contact R6 and transmit enable output line 100*b* is connected to contact C1. In the circuit diagram in the appendix, the receive audio output of the cellular transceiver is designated as "RX VOICE" and the transmit audio input of the cellular transceiver is designated as "TX VOICE." Thus referring to FIG. 2, audio output 64 of the digital communicator is connected to the "TX VOICE" input of the Western Union cellular transceiver. Likewise, the "RX VOICE" output of the Western Union cellular transceiver is connected to the digital communicator interrogation input 62.

In the operation of the device, it may be assumed that an alarm condition exists in zone 1. An alarm signal will be sent on line 12 to alarm control panel 10. This will provide a high input signal via line 24 at zone 1 input 34 of digital communicator 32. Transistor 84 (FIG. 2) will conduct to energize relay 86 causing relay 80 (FIG. 3) to be energized, thereby closing contacts 68 and providing a signal pulse on lines 100*a*, 100*b* to the transmit enable data input of the keyboard.

When the device was installed by the alarm company, the keyboard was programmed with the telephone number of the alarm monitoring station. The signal on lines 100*a*, 100*b* will cause the keyboard transmit enable line to effectively dial the telephone number of the alarm monitoring station. This telephone call will be transmitted via antenna 104, which is connected to cellular transceiver 84, with an over-the-air transmission to antenna 106 of a cellular site 108. The computer at cellular site 108 is hard wired through a central control site or telephone company 110 which is hard wired to an alarm monitoring station 112. In this manner, the telephone call is picked up at cellular site 108 and transmitted to alarm monitoring station 112. The alarm monitoring station answers the ring and then sends out a "handshake" tone which is transmitted by the cellular site 108 back to cellular transceiver 84 in an over-the-air transmission. This "handshake" tone is received by the receive audio output 94 of cellular transceiver 84. This tone, which is approximately a 2100 hertz signal, is transmitted via line 96 to the interrogation input 62 of the digital communicator 32. This will command the digital communicator to send out the appropriate information.

While the digital communicator normally sends a DTMF signal to the telephone line, in the instant application a 2200 hertz pulse signal is transmitted from audio output 64 via line 90 to the transmit audio input 92 of the cellular transceiver. This pulse signal identifies the subscriber (i.e., location) and the emergency code, at the rate of about ten pulses per second, with each pulse representing a digit. The cellular transceiver transmits, in an over-the-air transmission, this identification pulse signal to the cellular site 108. This identification pulse signal is then transmitted from cellular site 108 to the alarm monitoring station 112 and the alarm monitoring station computer is then informed of the status, such as who the customer is, whether it is a robbery, a fire, a burglary, etc. Alarm monitoring station computer 112 then sends another "handshake" or "request to send" signal that is transmitted from the cellular site 108 to the receive audio output 94 of cellular transceiver 84 in an over-the-air transmission. This "handshake" signal is fed via line 96 to the interrogation input 62 of digital communicator 32, effectively requesting a verification signal. Another 2200 hertz pulse identification signal is provided at audio output 64 and is transmitted via line 90 to the transmit audio input 92 of cellular transceiver 84. It is then transmitted to the cellular site 108 in an over-the-air transmission and is forwarded to alarm monitoring station 112. The alarm monitoring station 112 computer will print the identification information each time it is received, such as "202 code 1". If the same identification is received twice, it is considered to be verified and the alarm monitoring station 112 will send a "kiss-off" tone which is transmitted by the cellular site 108 in an over-the-air transmission to the cellular transceiver 84. In addition, the alarm monitoring station 112 will telephone the police or take whatever action is appropriate.

It can be seen that a novel alarm system has been provided which is relatively tamperproof compared to the alarm systems utilizing telephone lines that are hard wired from the protected premises to a police station or a central office. Although an illustrative embodiment of the invention has been shown and described, it is to be understood that various modifications and substitutions may be made by those skilled in the art without departing from the novel spirit and scope of the present invention.

What is claimed is:

1. An alarm system for a protected premises at a fixed location, which comprises:

a digital communicator;

means for connecting an alarm signal line to said digital communicator;

a cellular transceiver, said cellular transceiver having programmable means, an audio input and an audio output;

said digital communicator having an audio output and an interrogation input;

means coupling said digital communicator audio output to said cellular transceiver audio input;

means coupling said cellular transceiver audio output to said digital communicator interrogation input;

an antenna connected to said cellular transceiver, whereby an alarm signal received by said digital communicator will operate said cellular transceiver to transmit an over-the-air signal to a cellular site, where it can be forwarded to an alarm monitoring station with the alarm monitoring station being placed in two-way communication with the cellular transceiver via the cellular site.

2. An alarm system as described in claim 1, in which said digital communicator includes a plurality of alarm inputs, with each of the inputs representing a selected location or emergency condition.

3. An alarm system as described in claim 1, in which said digital communicator includes a transmit enable output and a receive enable output and said programmable means comprises a keyboard having a transmit enable data line and a receive enable data line; means connecting said digital communicator receive enable output to said keyboard receive enable data line and means connecting said digital communicator transmit enable output to said keyboard transmit enable data line.

4. An alarm system as described in claim 1, in which said digital communicator audio output comprises a dual tone multiple frequency (DTMF) output.

5. An alarm system as described in claim 1, in which said digital communicator includes a transmit enable output and a receive enable output, said cellular transceiver includes a transmit enable data line and a receive enable data line, means coupling said transmit enable output to said transmit enable data line, and means coupling said receive enable output to said receive enable data line; said digital communicator and cellular transceiver being operable in a manner whereby an alarm signal received by said digital communicator will cause said transmit enable output to transmit a signal to said transmit enable data line enabling said cellular transceiver to transmit a call from a programmed telephone number via over-the-air transmission to a cellular site, the cellular site can communicate with an alarm monitoring station which will cause the transmission of an over-the-air signal to said cellular transceiver audio output, thereby causing a signal to be transmitted to the digital communicator interrogation input, with a code signal being transmitted from said digital communicator audio output to the cellular transceiver audio input and then transmitted over the air to said cellular site and forwarded to the alarm monitoring company.

6. An alarm system as described in claim 1, in which said digital communicator includes a plurality of alarm inputs, with each of the inputs representing a selected location or emergency condition; said digital communicator audio output comprising a dual tone multiple frequency (DTMF) output; said digital communicator including a transmit enable output and a receive enable output; said programmable means comprising a keyboard having a transmit enable data line and a receive enable data line; means connecting said digital communicator receive enable output to said keyboard receive enable data line; and means connecting said digital communicator transmit enable output to said keyboard transmit enable data line.

7. A system for providing a relatively tamperproof alarm of a protected premises at a fixed location, which comprises the steps of:

providing a digital communicator having an audio input and an interrogation input;

coupling an alarm signal line to said digital communicator;

providing a cellular transceiver having a programmable means, an audio input and an audio output;

coupling said digital communicator audio output to said cellular transceiver audio input;

coupling said cellular transceiver audio output to said digital communicator interrogation input;

when an alarm condition occurs, providing a signal from said digital communicator to said cellular transceiver to automatically transmit an over-the-air signal to a cellular site, where it can be forwarded to an alarm monitoring station with the alarm monitoring station being placed in two-way communication with the cellular transceiver via the cellular site.

8. A system as described in claim 7, in which said digital communicator includes a transmit enable output and a receive enable output and said programmable means comprises a keyboard having a transmit enable data line and a receive enable data line; and including the step of coupling said digital communicator receive enable output to said keyboard receive enable data line and the step of connecting said digital communicator transmit enable output to said keyboard transmit enable data line.

9. A system as described in claim 8, wherein an alarm signal received by said digital communicator will cause said transmit enable output to transmit a signal to said transmit enable data line enabling said cellular transceiver to transmit a programmed telephone number via over-the-air transmission to a cellular site, the cellular site can communicate with an alarm monitoring station which will cause the transmission of an over-the-air signal to said cellular transceiver audio output, thereby causing a signal to the transmitted to the digital communicator interrogation input, with a code signal being transmitted from said digital communicator audio output to the cellular transceiver audio input and then transmitted over the air to said cellular site.

* * * * *